US010935146B2

(12) United States Patent
Wu et al.

(10) Patent No.: US 10,935,146 B2
(45) Date of Patent: Mar. 2, 2021

(54) T-JOINT HAVING PUSH-BUTTON SWITCH

(71) Applicant: Purity (Xiamen) Sanitary Ware Co., Ltd., Xiamen (CN)

(72) Inventors: James Wu, Taichung (TW); Alex Wu, Taichung (TW); Ce-Wen Yang, Xiamen (CN)

(73) Assignee: PURITY (XIAMEN) SANITARY WARE CO., LTD., Xiamen (CN)

( * ) Notice: Subject to any disclaimer, the term of this patent is extended or adjusted under 35 U.S.C. 154(b) by 43 days.

(21) Appl. No.: 16/405,755

(22) Filed: May 7, 2019

(65) Prior Publication Data
US 2020/0355310 A1    Nov. 12, 2020

(51) Int. Cl.
| F16K 11/044 | (2006.01) |
| F16L 41/02 | (2006.01) |
| F16K 31/60 | (2006.01) |
| B05B 1/16 | (2006.01) |
| E03C 1/04 | (2006.01) |

(52) U.S. Cl.
CPC .......... F16K 11/044 (2013.01); B05B 1/1618 (2013.01); E03C 1/0408 (2013.01); F16L 41/021 (2013.01); F16K 31/602 (2013.01); Y10T 137/87788 (2015.04)

(58) Field of Classification Search
CPC ..... F16L 47/285; F16L 41/021; F16K 11/044; F16K 11/0445; F16K 11/04; F16K 31/602; E03C 1/0408; Y10T 137/87788; B05B 1/1618; B05B 1/1609; B05B 1/18
See application file for complete search history.

(56) References Cited

U.S. PATENT DOCUMENTS

| 3,112,073 A * | 11/1963 | Larson ................ E03C 1/0408 239/446 |
| 3,236,253 A * | 2/1966 | Symmons ........... F16K 11/0445 137/119.05 |
| 3,461,870 A * | 8/1969 | Van Linge ............ A61M 3/022 604/118 |
| 4,606,370 A * | 8/1986 | Geipel ................ F16K 11/0445 137/119.05 |
| 6,618,872 B1 * | 9/2003 | Fan ....................... B05B 1/1618 239/444 |
| 6,859,955 B2 * | 3/2005 | Hudson ................... E03C 1/046 239/315 |

(Continued)

FOREIGN PATENT DOCUMENTS

DE       3442490 A1 *  5/1986 ............ B05B 12/04
DE  102013009194 A1 * 12/2013

*Primary Examiner* — David Colon-Morales
(74) *Attorney, Agent, or Firm* — Birch, Stewart, Kolasch & Birch, LLP

(57) ABSTRACT

A T-joint includes a pipe body and a switch. The pipe body includes an inlet opening, a first outlet opening, a second outlet opening and a switch accommodating space communicating with each other. The switch is positioned into the switch accommodating space of the pipe body, and includes a pressed member and an outlet-selecting member. The pressed member and the outlet-selecting member are connected to each other. By pressing either a first pressed portion or a second pressed portion of the pressed member, the isolating member of the switch could be positioned to lead the inlet opening to communicate with a corresponding one of the first outlet opening and the second outlet opening.

21 Claims, 6 Drawing Sheets

(56) References Cited

U.S. PATENT DOCUMENTS

| | | | | |
|---|---|---|---|---|
| 7,104,473 | B2* | 9/2006 | Bosio | B05B 1/1618 |
| | | | | 239/445 |
| 7,120,948 | B1* | 10/2006 | Fan | F16K 11/0445 |
| | | | | 4/615 |
| 7,320,442 | B2* | 1/2008 | Bosio | B05B 1/1618 |
| | | | | 239/569 |
| 7,341,239 | B2* | 3/2008 | Hodel | F16K 31/52416 |
| | | | | 137/872 |
| 7,344,095 | B1* | 3/2008 | Hsu | B05B 1/1618 |
| | | | | 239/583 |
| 8,418,720 | B2* | 4/2013 | Cen | E03C 1/023 |
| | | | | 137/625.48 |
| 9,272,295 | B2* | 3/2016 | Esche | B05B 12/002 |
| 9,707,574 | B2* | 7/2017 | Soetaert | B05B 1/18 |
| 2005/0060800 | A1* | 3/2005 | Fan | E03C 1/0408 |
| | | | | 4/601 |
| 2006/0016912 | A1* | 1/2006 | Nobili | B05B 1/1618 |
| | | | | 239/525 |
| 2008/0302886 | A1* | 12/2008 | Hodel | B05B 12/002 |
| | | | | 239/443 |
| 2016/0339455 | A1* | 11/2016 | Lin | E03C 1/023 |
| 2016/0340874 | A1* | 11/2016 | Liang | F16K 11/0445 |
| 2017/0130432 | A1* | 5/2017 | Searcy | F16K 19/00 |
| 2020/0197960 | A1* | 6/2020 | Zhang | B05B 1/185 |

\* cited by examiner

… … …

T-JOINT HAVING PUSH-BUTTON SWITCH

BACKGROUND OF THE INVENTION

1. Technical Field

The present disclosure relates generally to a T-joint, and more particularly to a T-joint having push-button switch.

2. Description of Related Art

In the erection of a general water flow pipeline, a single pipeline is usually divided into two by a T-joint. A regulating valve is installed on the T-joint to regulate the flow ways of the water flow. Most of the conventional regulating valves are knob-type or wrench-type.

However, in order to be conveniently manually operated by a user, the knob-type or the wrench-type regulating valve installed on the conventional T-joint may obviously protrude from a surface of the T-joint, so the installation position and the installation direction of the conventional T-joint with the knob-type or the wrench-type regulating valve are significantly limited, whereby to reduce the applicability of the conventional T-joint.

In addition, in accordance with the previous outlet function of the regulating valve, the conventional T-joint will outlets in the same outlet direction for the next use. Therefore, the conventional T-joint should be further confirmed the outlet direction thereof before each time to use, and even the conventional T-joint often needs to adjust the outlet direction of the valve first, and then turn on the water flow. However, such conventional T-joint is quite inconvenient for the user in use.

At least for the above reasons, the conventional T-joint still have room for improvements.

BRIEF SUMMARY OF THE INVENTION

In view of the above, the primary objective of the present disclosure is to provide a T-joint having a push-button switch which could regulate the flow way of the water flow, and the push-button switch installed on the T-joint does not protrude from the T-joint, so that the T-joint provided in the present invention could be conveniently installed. Furthermore, the T-joint provided in the present invention would be reset after a water flow stops flowing. For example, the T-joint outlets from a second outlet opening before the water flow stops flowing, the T-joint is reset after the water flow stops flowing, and then the T-joint would outlet from a main outlet opening when the water flow is started to flow again.

The present disclosure provides a T-joint. The T joint includes a pipe body and a switch. The a pipe body includes an inlet opening, a first outlet opening, a second outlet opening and a switch accommodating space, wherein the inlet opening, the first outlet opening, the second outlet opening and the switch accommodating space communicate with each other. The switch is positioned into the switch accommodating space of the pipe body, and includes a pressed member and an outlet-selecting member, wherein the pressed member and the outlet-selecting member are connected to each other. The switch includes an isolating member positioned on the outlet-selecting member. When a first pressed portion of the pressed member is pressed, the isolating member of the switch is positioned to isolate the inlet opening from the second outlet opening, but the first outlet opening communicates with the inlet opening, whereby a water flow merely outlets from the first outlet opening. When a second pressed portion of the pressed member is pressed, the isolating member of the switch is positioned to isolate the inlet opening from the first outlet opening, but the second outlet opening communicates with the inlet opening, whereby a water flow merely outlets from the second outlet opening.

With the aforementioned design, a T-joint having a push-button switch which could regulate the flow way of the water flow, and the push-button switch installed on the T-joint does not protrude from the T-joint, so that the T-joint provided in the present invention could be conveniently installed. Furthermore, the T-joint provided in the present invention would be reset after a water flow stops flowing. For example, the T-joint outlets from a second outlet opening before the water flow stops flowing, the T-joint is reset after the water flow stops flowing, and then the T-joint would outlet from a main outlet opening when the water flow is started to flow again.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
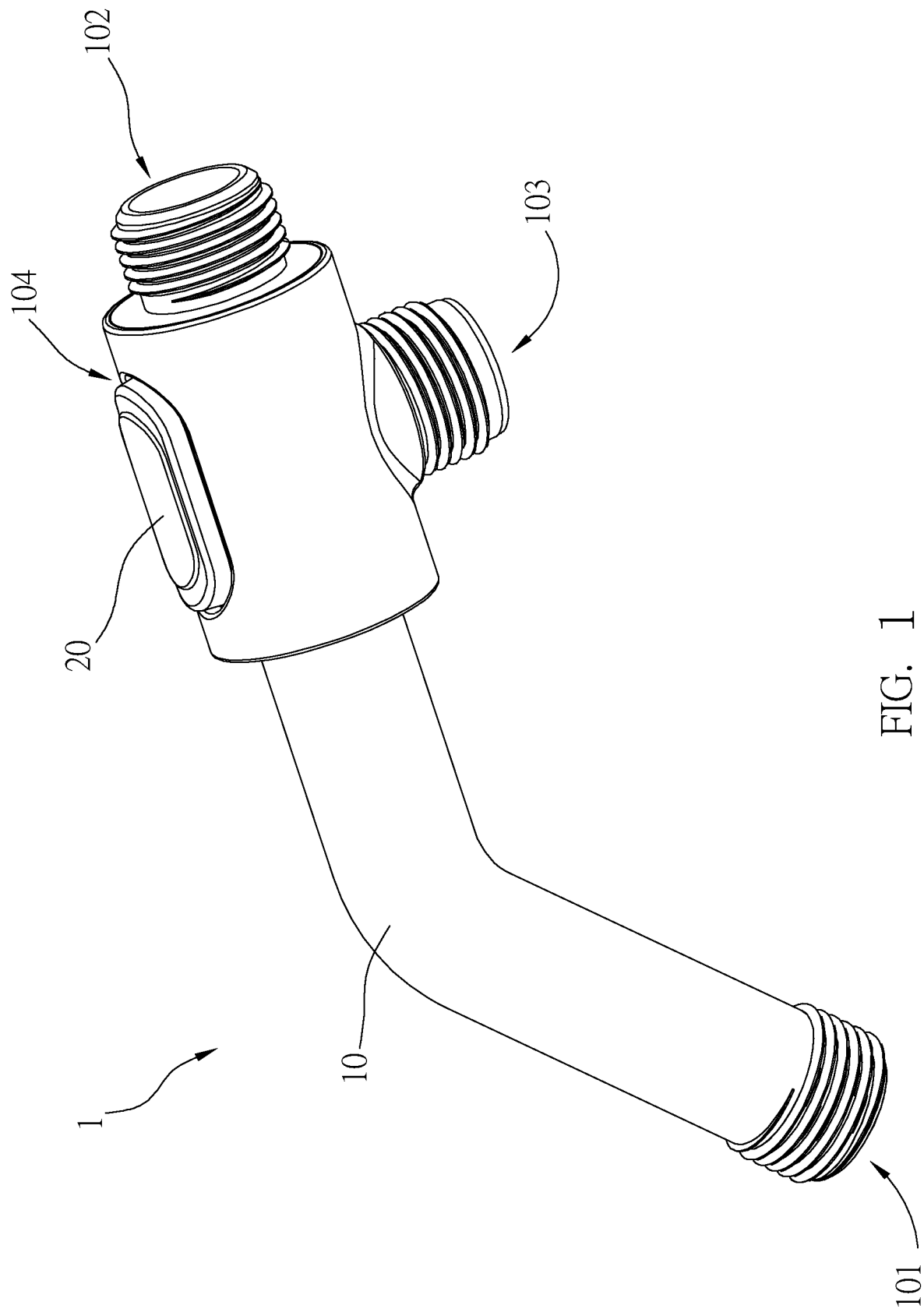
FIG. 1 is a perspective view of a T-joint of one embodiment of the present disclosure.
Figure 2:
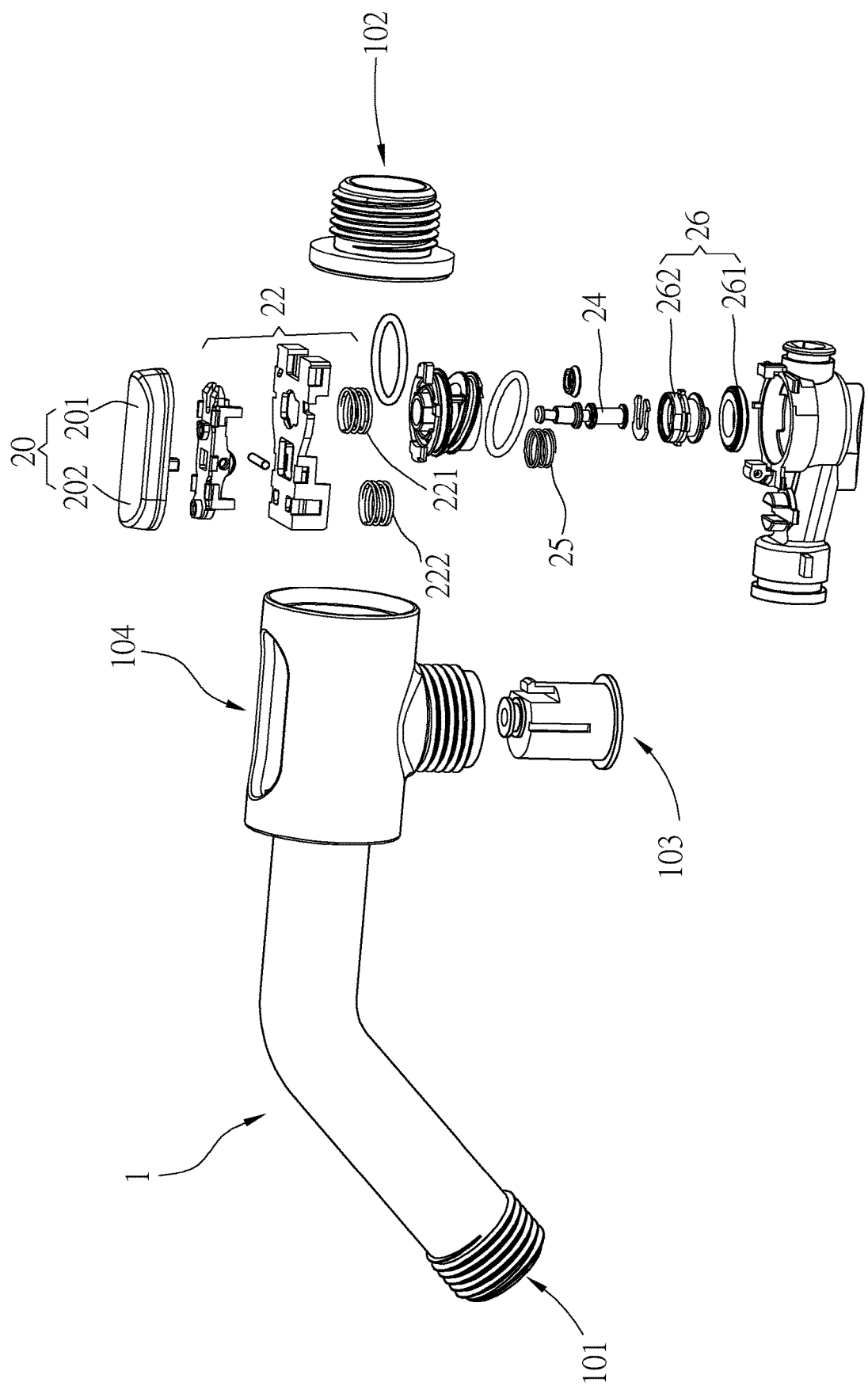
FIG. 2 is an exploded view of the T-joint of one embodiment of the present disclosure.

As illustrated in FIG. 1 to FIG. 6, a T-joint 1 is provided. The T-joint 1 includes a pipe body 10 and a switch 20. The pipe body 10 includes an inlet opening 101, a first outlet opening 102, a second outlet opening 103 and a switch accommodating space 104. According to one embodiment of the present invention, the inlet opening 101, the first outlet opening 102, the second outlet opening 103 and the switch accommodating space 104 communicate with each other.

The switch 20 is positioned into the switch accommodating space 104 of the pipe body 10, and includes a pressed member 22 and an outlet-selecting member 24, wherein the pressed member 22 and the outlet-selecting member 24 are connected to each other. According to one embodiment of the present invention, the switch 20 includes an isolating member 26 positioned on the outlet-selecting member 24.

When a first pressed portion 201 of the pressed member 22 is pressed, the isolating member 26 of the switch 20 is positioned to isolate the inlet opening 101 from the second outlet opening 103, but the first outlet opening 102 communicates with the inlet opening 101, whereby a water flow F merely outlets from the first outlet opening 102.

When a second pressed portion 202 of the pressed member 22 is pressed, the isolating member 26 of the switch 20 is positioned to isolate the inlet opening 101 from the first outlet opening 102, but the second outlet opening 103 communicates with the inlet opening 101, whereby the water flow F merely outlets from the second outlet opening 103.

Referring to FIG. 3 to FIG. 6, the switch 20 includes a pivot axis 203 connected to the pressed member 22, when the first pressed portion 201 or the second pressed portion 202 of the pressed member 22 is pressed, the pressed member 22 is pivoted to be tilted. According to one embodiment of the present invention, the pivot axis 203 is positioned between the first pressed portion 201 and the second pressed portion 202.

According to one embodiment of the present invention, the isolating member 26 includes a sealing ring 261 and an end cap 262, as shown in FIG. 3 to FIG. 6. The sealing ring 261 is wound around the end cap 262, and the end cap 262 is sleeved to one end of the outlet-selecting member 24 while another end of the outlet-selecting member 24 is connected to the pressed member 22.

In FIG. 3 to FIG. 6, the switch 20 includes a first reset member 221. The first reset member 221 is connected to the first pressed portion 201 of the pressed member 22. When the first pressed portion 201 of the pressed member 22 stops being pressed, the pressed member 22 is moved to a horizontal position by the first reset member 221.

Figure 4:
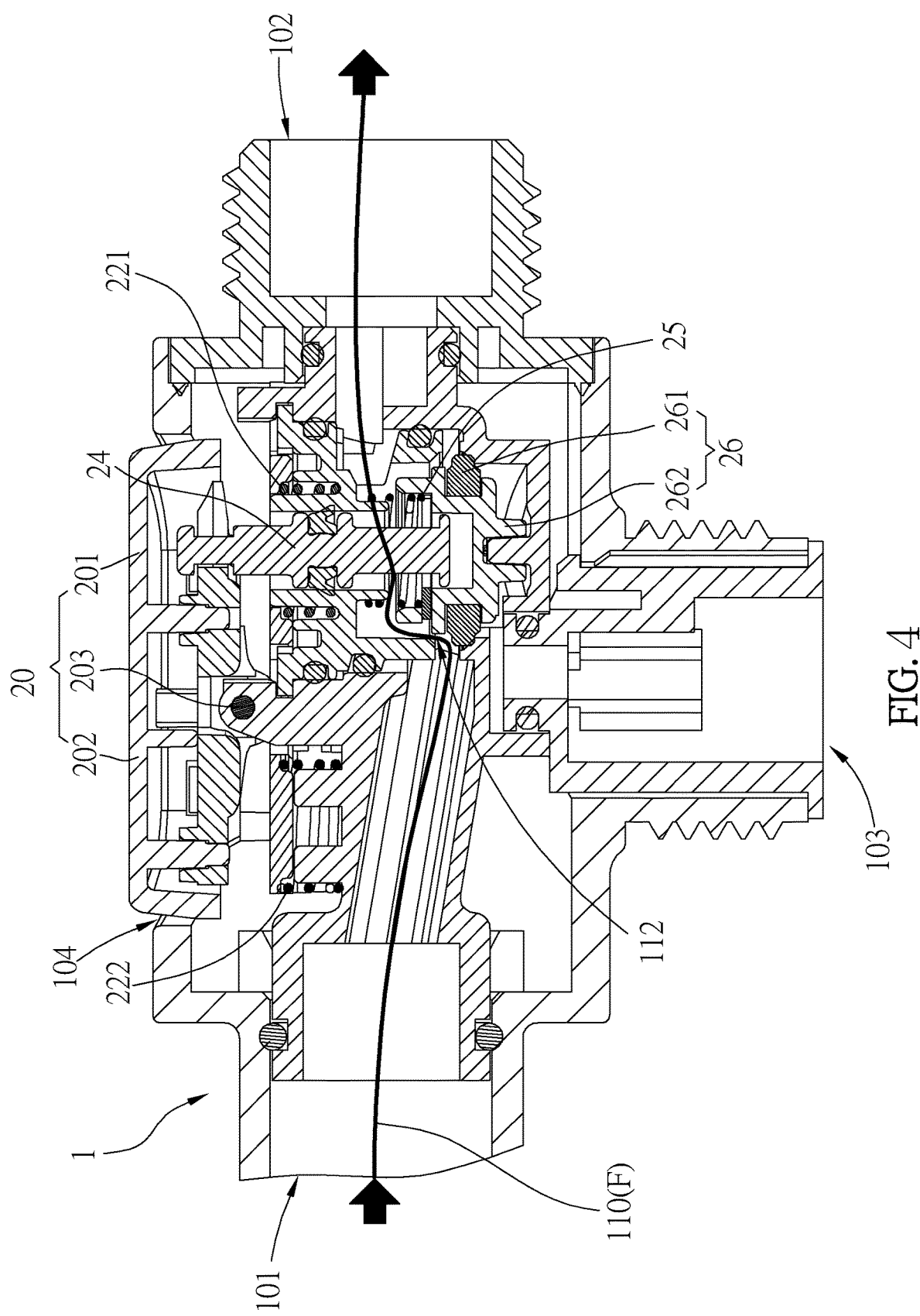
FIG. 4 is a cross-sectional view of the T-joint of one embodiment of the present disclosure, wherein the front portion of the push-button switch stops being pressed, and then the push-button switch reverts to the original state.

According to one embodiment of the present invention, the first reset member 221 is a spring connected to the first pressed portion 201 of the pressed member 22. When the first pressed portion 201 of the pressed member 22 is pressed, the pressed member 22 is tilted. When the first pressed portion 201 of the pressed member 22 stops being pressed, the pressed member 22 is returned to the horizontal position by the spring 221. As shown in FIG. 4, when the pressed member 22 is returned to the horizontal position, the pressed member 22 does not protrude from the switch accommodating space 104.

The switch includes a second reset member 222 connected to the second pressed portion 202 of the pressed member 22, when the second pressed portion 202 of the pressed member 22 stops being pressed, the pressed member 22 is moved to a horizontal position by the second reset member 222.

Figure 6:
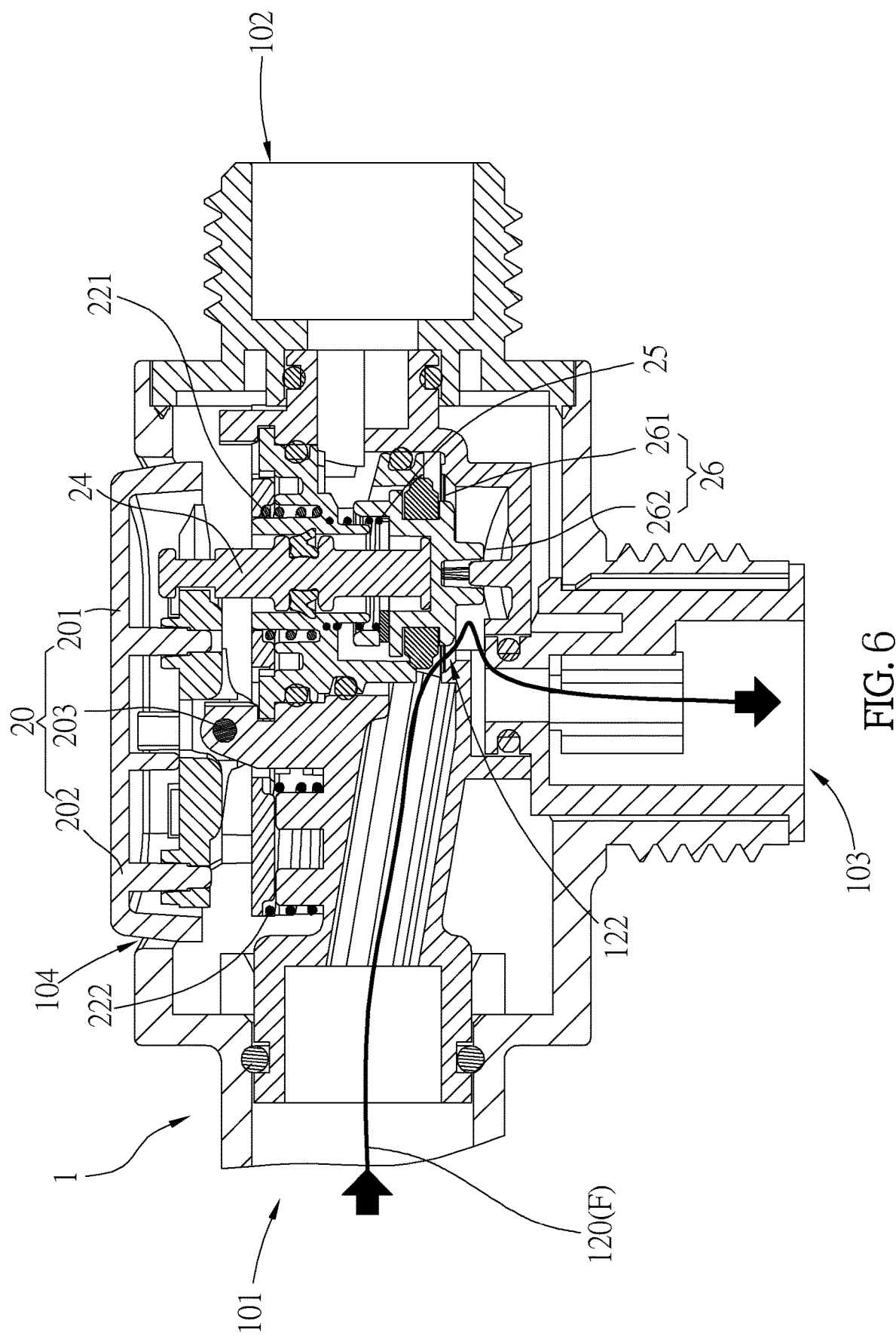
FIG. 6 is a cross-sectional view of the T-joint of one embodiment of the present disclosure, wherein the rear portion of the push-button switch stops being pressed, and then push-button switch reverts to the original state.

According to one embodiment of the present invention, the second reset member 222 is a spring connected to the second pressed portion 202 of the pressed member 22. When the second pressed portion 202 of the pressed member 22 is pressed, the pressed member 22 is tilted. When the second pressed portion 202 of the pressed member 22 stops being pressed, the pressed member 22 is returned to the horizontal position by the spring 222. As shown in FIG. 6, when the pressed member 22 is returned to the horizontal position, the pressed member 22 does not protrude from the switch accommodating space 104.

The outlet-selecting member 24 is connected to the pressed member 22, and can be driven by the pressed member 22 to move. When the first pressed portion 201 of the pressed member 22 is pressed, the first pressed portion 201 abuts against the outlet-selecting member 24 to move in a first direction D1. When the second pressed portion 202 of the pressed member 22 is pressed, the first pressed portion 201 pulls the outlet-selecting member 24 to move in a second direction D2 opposite to the first direction D1.

According to one embodiment of the present invention, the pipe body 10 includes a first flow way 110 and a second flow way 120, wherein the first flow way 110 communicates with the first outlet opening 102 and the inlet opening 101, and the second flow way 120 communicates with the second outlet opening 103 and the inlet opening 101. According to one embodiment of the present invention, one part of the first flow way 110 is isolated from the second flow way 120.

Figure 3:
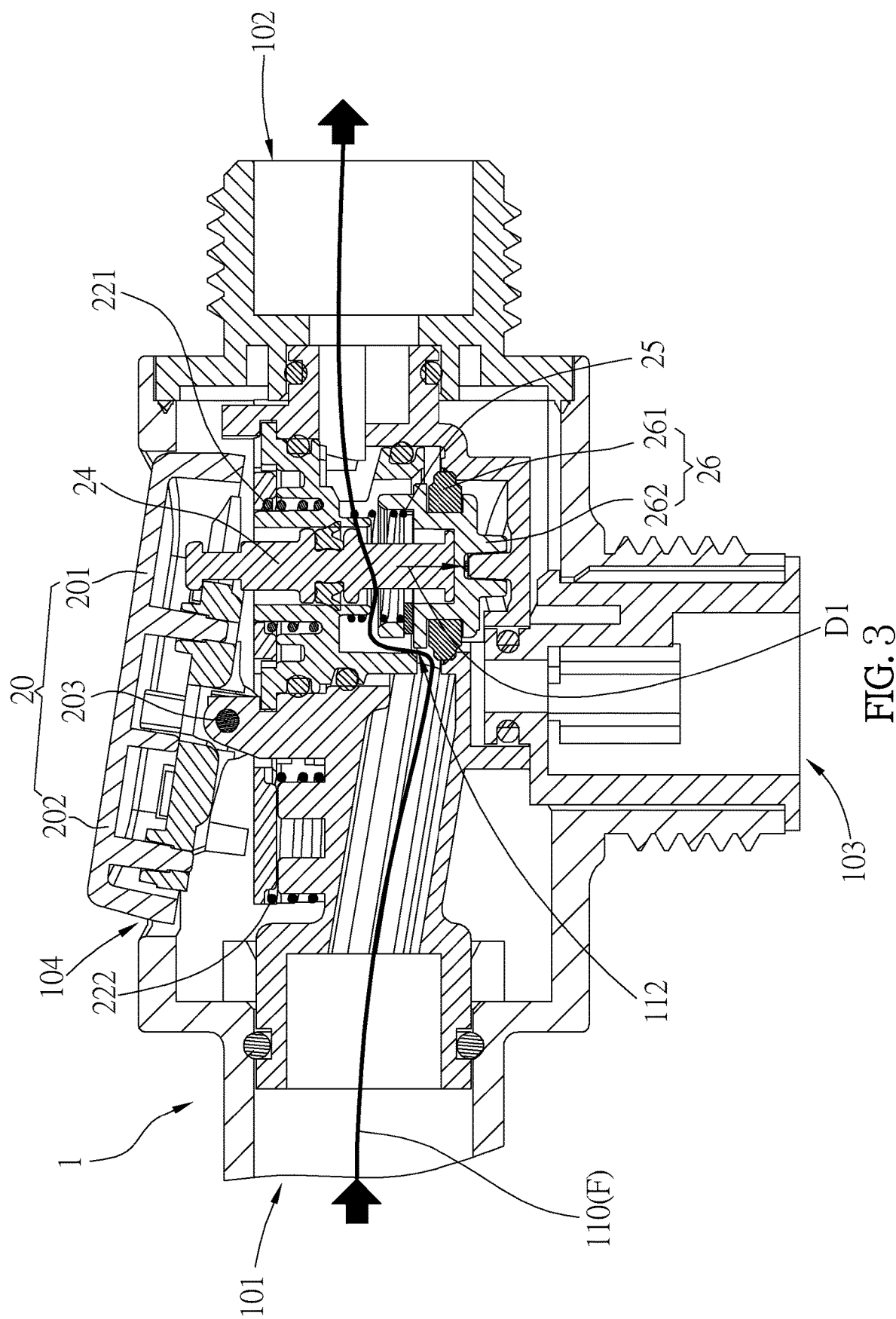
FIG. 3 is a cross-sectional view of the T-joint of one embodiment of the present disclosure, wherein a front portion of a push-button switch is pressed in order to outlet from a first outlet opening.

As shown in FIG. 3, when the first pressed portion 201 abuts against the outlet-selecting member 24 to move in the first direction D1, the isolating member 26 is driven by the outlet-selecting member 24 to plug the second flow way 120, so that the water flow F merely outlets from the first outlet opening 102.

According to one embodiment of the present disclosure, the second flow way 120 has a blocking bore 122. When the first pressed portion 201 abuts against the outlet-selecting member 24 to move in the first direction D1, the isolating member 26 is driven by the outlet-selecting member 24 to plug the blocking bore 122 of the second flow way 120, so that the water flow F merely outlets from the first outlet opening 102.

Figure 5:
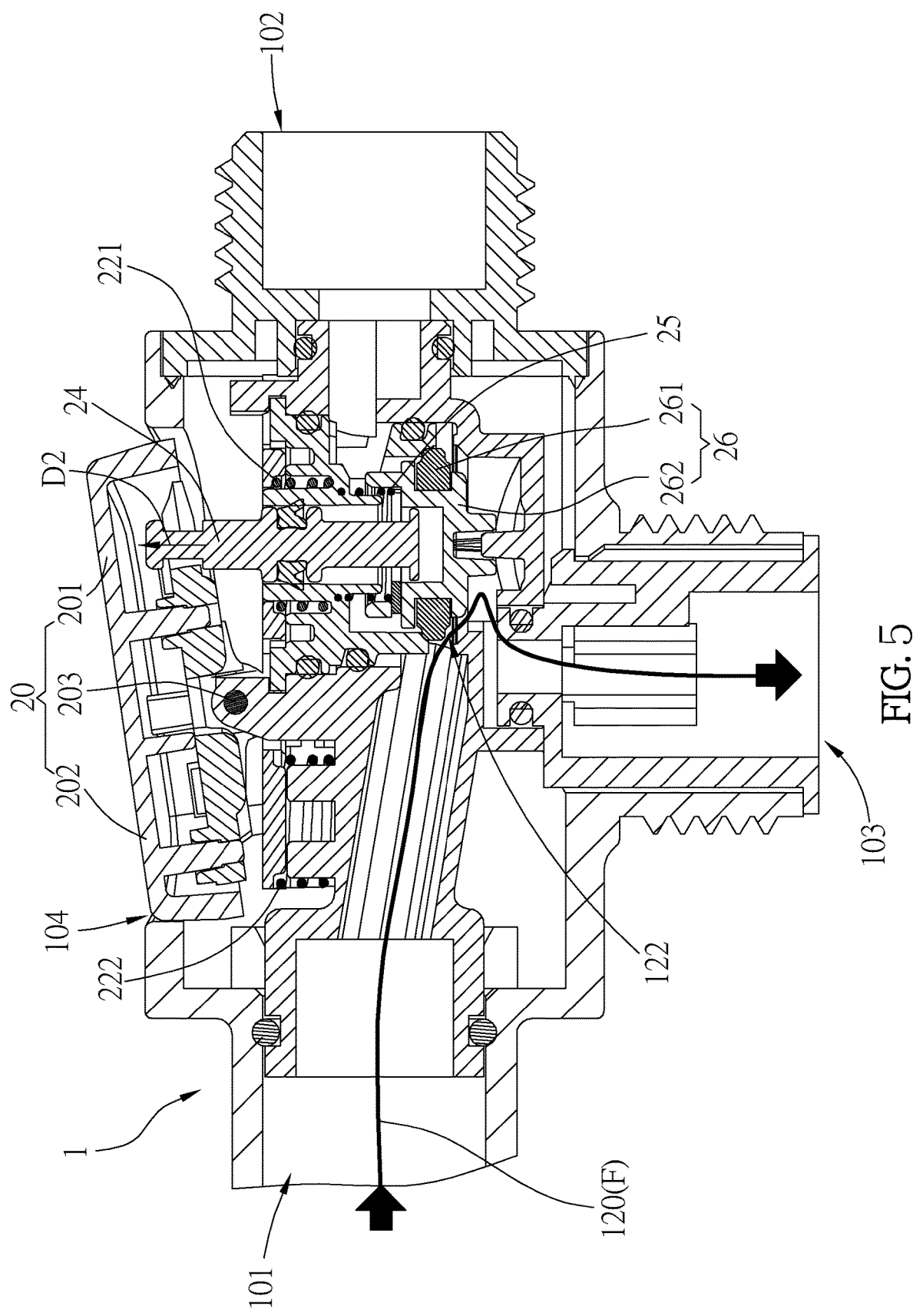
FIG. 5 is a cross-sectional view of the T-joint of one embodiment of the present disclosure, wherein a rear portion of the push-button switch is pressed in order to outlet from a second outlet opening.

As shown in FIG. 5, when the first pressed portion 201 pulls the outlet-selecting member 24 to move in the second direction D2, the isolating member 24 is driven by the outlet-selecting member 24 to plug the first flow way 110, so that the water flow F merely outlets from the second outlet opening 103.

According to one embodiment of the present invention, the first flow way 110 has a blocking bore 112. When the first pressed portion 201 pulls the outlet-selecting member 24 to move in the second direction D2, the isolating member 26 is driven by the outlet-selecting member 24 to plug the blocking bore 112 of the first flow way 110, so that the water flow F merely outlets from the second outlet opening 103.

According to one embodiment of the present invention, the switch 20 includes a third reset member 25. The third reset member 25 is connected to the outlet-selecting member 24. When the second pressed portion 202 of the pressed member 22 is pressed, and the first pressed portion 201 pulls the outlet-selecting member 24 to moving in the second direction D2, the third reset member 25 is compressed to store a reset force. According to one embodiment of the present invention, the third reset member 25 includes a spring.

As shown in FIG. 5 to FIG. 6, when the first pressed portion 201 pulls the outlet-selecting member 24 to move in the second direction D2, whereby the water flow F merely outlets from the second outlet opening 103, the water flow F would resist the reset force stored by the third reset member 25, so that the third reset member 25 cannot drive the isolating member 26 to plug the second flow way 120.

According to one embodiment of the present invention, when the water flow F stops, the reset force stored by the third reset member 25 drives the isolating member 26 to move in the first direction D1, whereby to plug the second flow way 120. Then, when the water flow F is started to flow, the water flow F merely outlets from the first outlet opening 102, for the isolating member 26 plugs the second flow way 120, and the inlet opening 101 communicates with the first outlet opening 102.

With the aforementioned design, a T-joint having a push-button switch which could regulate the flow way of the water flow, and the push-button switch installed on the T-joint does not protrude from the T-joint, so that the T-joint provided in the present invention could be conveniently installed. Furthermore, the T-joint provided in the present invention would be reset after a water flow stops flowing. For example, the T-joint outlets from a second outlet opening before the water flow stops flowing, the T-joint is reset after the water flow stops flowing, and then the T-joint would outlet from a main outlet opening when the water flow is started to flow again.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A T-joint, comprising:
   a pipe body, comprising an inlet opening, a first outlet opening, a second outlet opening and a switch accommodating space, wherein the inlet opening, the first outlet opening, the second outlet opening and the switch accommodating space communicate with each other; and
   a switch, positioned into the switch accommodating space of the pipe body, and comprising a pressed member and an outlet-selecting member, wherein the pressed member and the outlet-selecting member are connected to each other; the switch comprises an isolating member positioned on the outlet-selecting member;
   when a first pressed portion of the pressed member is pressed, the isolating member of the switch is positioned to isolate the inlet opening from the second outlet opening, but the first outlet opening communicates with the inlet opening, whereby a water flow merely outlets from the first outlet opening;
   when a second pressed portion of the pressed member is pressed, the isolating member of the switch is positioned to isolate the inlet opening from the first outlet opening, but the second outlet opening communicates with the inlet opening, whereby the water flow merely outlets from the second outlet opening;
   wherein the switch comprises a first reset member connected to the first pressed portion of the pressed member, when the first pressed portion of the pressed member stops being pressed, the pressed member is moved to a horizontal position by the first reset member.

2. The T-joint of claim 1, wherein the first reset member is a spring connected to the first pressed portion of the pressed member, when the first pressed portion of the pressed member is pressed, the pressed member is tilted; when the first pressed portion of the pressed member stops being pressed, the pressed member is returned to the horizontal position by the spring.

3. The T-joint of claim 1, wherein when the pressed member is returned to the horizontal position, the pressed member does not protrude from the switch accommodating space.

4. The T-joint of claim 1, wherein the switch comprises a second reset member connected to the second pressed portion of the pressed member, when the second pressed portion of the pressed member stops being pressed, the pressed member is moved to a horizontal position by the second reset member.

5. The T-joint of claim 4, wherein the second reset member is a spring connected to the second pressed portion of the pressed member, when the second pressed portion of the pressed member is pressed, the pressed member is tilted; when the second pressed portion of the pressed member stops being pressed, the pressed member is returned to the horizontal position by the spring.

6. The T-joint of claim 4, wherein when the pressed member is returned to the horizontal position, the pressed member does not protrude from the switch accommodating space.

7. The T-joint of claim 1, wherein the outlet-selecting member is connected to the pressed member, and can be driven by the pressed member to move; when the first pressed portion of the pressed member is pressed, the first pressed portion abuts against the outlet-selecting member to move in a first direction; when the second pressed portion of the pressed member is pressed, the first pressed portion pulls the outlet-selecting member to move in a second direction opposite to the first direction.

8. The T-joint of claim 7, wherein the pipe body comprises a first flow way and a second flow way, the first flow way communicates with the first outlet opening and the inlet opening, and the second flow way communicates with the second outlet opening and the inlet opening, one part of the first flow way is isolated from the second flow way.

9. The T-joint of claim 8, wherein when the first pressed portion abuts against the outlet-selecting member to move in the first direction, the isolating member is driven by the outlet-selecting member to plug the second flow way, so that the water flow merely outlets from the first outlet opening.

10. The T-joint of claim 9, wherein the second flow way has a blocking bore, when the first pressed portion abuts against the outlet-selecting member to move in the first direction, the isolating member is driven by the outlet-selecting member to plug the blocking bore of the second flow way, so that the water flow merely outlets from the first outlet opening.

11. The T-joint of claim 8, wherein when the first pressed portion pulls the outlet-selecting member to move in the second direction, the isolating member is driven by the outlet-selecting member to plug the first flow way, so that the water flow merely outlets from the second outlet opening.

12. The T-joint of claim 9, wherein the first flow way has a blocking bore, when the first pressed portion pulls the outlet-selecting member to move in the second direction, the isolating member is driven by the outlet-selecting member to plug the blocking bore of the first flow way, so that the water flow merely outlets from the second outlet opening.

13. The T-joint of claim 8, wherein the switch comprises a third reset member connected to the outlet-selecting member, when the second pressed portion of the pressed member is pressed, and the first pressed portion pulls the outlet-selecting member to moving in the second direction, the third reset member is compressed to store a reset force.

14. The T-joint of claim 13, wherein when the first pressed portion pulls the outlet-selecting member to move in the second direction, whereby the water flow merely outlets from the second outlet opening, the water flow would resist the reset force stored by the third reset member, so that the third reset member cannot drive the isolating member to plug the second flow way.

15. The T-joint of claim 14, wherein when the water flow stops, the reset force stored by the third reset member drives the isolating member to move in the first direction, whereby to plug the second flow way.

16. The T-joint of claim 15, wherein when the water flow is started to flow, the water flow merely outlets from the first outlet opening, for the isolating member plugs the second flow way, and the inlet opening communicates with the first outlet opening.

17. The T-joint of claim 13, wherein the third reset member comprises a spring.

18. The T-joint of claim 1, wherein the switch comprises a pivot axis connected to the pressed member, when the first pressed portion or the second pressed portion of the pressed member is pressed, the pressed member is pivoted to be tilted.

19. The T-joint of claim 18, wherein the pivot axis is positioned between the first pressed portion and the second pressed portion.

20. The T-joint of claim 1, wherein the isolating member comprises a sealing ring and an end cap, the sealing ring is wound around the end cap, and the end cap is sleeved to one end of the outlet-selecting member while another end of the outlet-selecting member is connected to the pressed member.

21. A T-joint, comprising:
- a pipe body, comprising an inlet opening, a first outlet opening, a second outlet opening and a switch accommodating space, wherein the inlet opening, the first outlet opening, the second outlet opening and the switch accommodating space communicate with each other; and
- a switch, positioned into the switch accommodating space of the pipe body, and comprising a pressed member and an outlet-selecting member, wherein the pressed member and the outlet-selecting member are connected to each other; the switch comprises an isolating member positioned on the outlet-selecting member;
- when a first pressed portion of the pressed member is pressed, the isolating member of the switch is positioned to isolate the inlet opening from the second outlet opening, but the first outlet opening communicates with the inlet opening, whereby a water flow merely outlets from the first outlet opening;
- when a second pressed portion of the pressed member is pressed, the isolating member of the switch is positioned to isolate the inlet opening from the first outlet opening, but the second outlet opening communicates with the inlet opening, whereby the water flow merely outlets from the second outlet opening;
- wherein the switch comprises a second reset member connected to the second pressed portion of the pressed member, when the second pressed portion of the pressed member stops being pressed, the pressed member is moved to a horizontal position by the second reset member.

\* \* \* \* \*